United States Patent
Lin et al.

(10) Patent No.: US 12,253,362 B2
(45) Date of Patent: Mar. 18, 2025

(54) INDOOR POSITIONING METHOD AND SYSTEM, COMPUTER DEVICE AND STORAGE MEDIUM

(71) Applicant: GLORYVIEW TECH INC., Guangzhou (CN)

(72) Inventors: Shanchi Lin, Guangzhou (CN); Yang Liu, Guangzhou (CN); Xiangguo Li, Guangzhou (CN); Shuangan Ding, Guangzhou (CN); Huangbo Cai, Guangzhou (CN); Guitao Hu, Guangzhou (CN)

(73) Assignee: GLORYVIEW TECH INC., Guangzhou (CN)

( * ) Notice: Subject to any disclaimer, the term of this patent is extended or adjusted under 35 U.S.C. 154(b) by 350 days.

(21) Appl. No.: 17/840,292

(22) Filed: Jun. 14, 2022

(65) Prior Publication Data

US 2023/0075684 A1  Mar. 9, 2023

Related U.S. Application Data

(63) Continuation of application No. PCT/CN2022/092516, filed on May 12, 2022.

(30) Foreign Application Priority Data

Sep. 6, 2021  (CN) .......................... 202111038878.0

(51) Int. Cl.
G01C 21/20 (2006.01)
G01S 5/02 (2010.01)
H04W 4/029 (2018.01)

(52) U.S. Cl.
CPC ........ G01C 21/206 (2013.01); G01S 5/02685 (2020.05); H04W 4/029 (2018.02)

(58) Field of Classification Search
None
See application file for complete search history.

(56) References Cited

U.S. PATENT DOCUMENTS

| | | | | |
|---|---|---|---|---|
| 2015/0285637 | A1* | 10/2015 | Kelly ..................... | G01C 21/12 701/410 |
| 2016/0123738 | A1* | 5/2016 | Bellusci ................. | G01C 17/00 702/150 |
| 2019/0227539 | A1* | 7/2019 | Golgiri .................... | B62D 1/00 |

* cited by examiner

*Primary Examiner* — Kenneth B Wells
(74) *Attorney, Agent, or Firm* — MUNCY, GEISSLER, OLDS & LOWE, P.C.

(57) ABSTRACT

An indoor positioning method includes judging whether a positioning terminal enters a coverage range of a virtual beacon. If yes, judging whether a distance between the positioning terminal and the virtual beacon gradually decreases to obtain a judgement result, according to the judgement result, adjusting the step size of a PDR positioning algorithm. When the distance gradually decreases, the step size of the PDR positioning algorithm is decreased, and when the distance gradually increases, the step size of the PDR positioning algorithm is increased. The positioning terminal is then positioned by a PDR positioning algorithm with the step size adjusted to obtain a positioning result. If not, the positioning terminal is positioned by a PDR positioning algorithm with the step size not adjusted to obtain a positioning result. According to the present invention positioning can be more accurate by adaptively adjusting the step size in the PDR positioning algorithm.

12 Claims, 3 Drawing Sheets

INDOOR POSITIONING METHOD AND SYSTEM, COMPUTER DEVICE AND STORAGE MEDIUM

CROSS REFERENCE TO RELATED APPLICATIONS

The present application is a continuation of International Application No. PCT/CN2022/092516, filed on May 12, 2022, which claims priority from Chinese Patent Application No. 202111038878.0 filed on Sep. 6, 2021, all of which are hereby incorporated herein by reference.

TECHNICAL FIELD

The present invention relates to the technical field of positioning, and particularly relates to an indoor positioning method and system, a computer device and a storage medium.

BACKGROUND

Presently, according to the main positioning technologies, taking into consideration of code security and positioning performance, the core positioning engine thereof is generally installed on the back-end central server, and the positioning algorithm process is mainly completed on the server. In such a way, a positioning request is initiated by the front end and a corresponding positioning result is returned by the back end, which may cause a problem of data lags, resulting in positioning deviation. Such problem will be more obvious, especially, in the cases of complex navigation path.

In a traditional real-time positioning program based on a back-end positioning engine, when updating positioning, as shown in FIG. 1, if real-time positioning passes through turns where a virtual beacon A and a virtual beacon B are located as shown in the figure, due to the lag of Pedestrian Dead Reckoning (PDR) data, the positioning result will be calculated according to the original travel direction, causing positioning deviation from the actual travel trajectory. The real-time position thus will be updated from P1 to P2, deviating from the actual travel trajectory. Although it is possible to return to the advanced trajectory by subsequent correction, it inevitably produces influences due to positioning lags.

SUMMARY

The present invention provides an indoor positioning method and system, a computer device and a storage medium, which is free from the aforesaid drawbacks of the prior art, achieving accurate positioning by adaptively adjusting the step size in a PDR positioning algorithm.

In a first aspect, an indoor positioning method is provided, including:
   judging whether a positioning terminal enters a coverage range of a virtual beacon,
   if yes, judging whether a distance between the positioning terminal and the virtual beacon gradually decreases to obtain a judgement result,
      adjusting the step size of a PDR positioning algorithm, according to the judgement result, when the distance gradually decreases, decreasing the step size of the PDR positioning algorithm, and when the distance gradually increases, increasing the step size of the PDR positioning algorithm, and
      positioning the positioning terminal by a PDR positioning algorithm with the step size adjusted to obtain a positioning result; and
   if not, positioning the positioning terminal by a PDR positioning algorithm with the step size not adjusted to obtain a positioning result.

According to the present invention, the indoor positioning method further includes:
   acquiring a pre-established constraint road network which includes several pieces of position information, and
   according to the constraint road network, determining one piece of position information closest to the positioning result, and using the determined position information as a final positioning result of the positioning terminal.

According to the present invention, the method for judging whether the positioning terminal enters the coverage range of the virtual beacon includes:
   judging whether the distance between the positioning terminal and the virtual beacon is less than a pre-set coverage radius,
   if yes, determining as entering the coverage range of the virtual beacon; and
   if not, determining as not entering the coverage range of the virtual beacon.

According to the present invention, the method for judging whether the distance between the positioning terminal and the virtual beacon gradually decreases to obtain the judgement result includes:
   at least acquiring the distance between the positioning terminal and the virtual beacon twice; and
   judging whether the distance between the positioning terminal and the virtual beacon acquired previously is greater than the distance between the positioning terminal and the virtual beacon acquired subsequently.
      if yes, obtaining the judgement result indicating that the distance between the positioning terminal and the virtual beacon gradually decreases; and
      if not, obtaining the judgement result indicating that the distance between the positioning terminal and the virtual beacon does not gradually decrease.

According to the present invention, when the distance gradually decreases, the method for decreasing the step size of the PDR positioning algorithm includes:
   when the distance gradually decreases, determining a step size decreasing strategy of the PDR positioning algorithm according to the distance, and decreasing the step size of the PDR positioning algorithm according to the determined step size decreasing strategy.

According to the present invention, when the distance gradually increases, the method for increasing the step size of the PDR positioning algorithm includes:
   when the distance gradually increases, determining a step size increasing strategy of the PDR positioning algorithm according to the distance, and increasing the step size of the PDR positioning algorithm according to the determined step size increasing strategy.

According to the present invention, the method for determining the step size decreasing strategy of the PDR positioning algorithm according to the distance, and decreasing the step size of the PDR positioning algorithm according to the determined step size decreasing strategy includes:
   determining a reduction coefficient according to the distance, and multiplying the reduction coefficient by the step size of the PDR positioning algorithm so as to decrease the step size of the PDR positioning algorithm.

According to the method for determining the step size increasing strategy of the PDR positioning algorithm according to the distance, and increasing the step size of the PDR positioning algorithm according to the determined step size increasing strategy includes:

determining a multiplication coefficient according to the distance, and multiplying the multiplication coefficient by the step size of the PDR positioning algorithm so as to increase the step size of the PDR positioning algorithm.

According to the present invention, when the distance gradually decreases, the method decreasing the step size of the PDR positioning algorithm includes:

when the distance gradually decreases, decreasing the step size of the PDR positioning algorithm according to a pre-set monotonic decreasing function.

According to the present invention, when the distance gradually increases, the method increasing the step size of the PDR positioning algorithm includes:

when the distance gradually increases, increasing the step size of the PDR positioning algorithm according to a pre-set monotonic increasing function.

In a second aspect, an indoor positioning system is provided, including:

- a range judging module, which is configured for judging whether a positioning terminal enters a coverage range of a virtual beacon,
- a walking trend judging module, which is configured for judging whether a distance between the positioning terminal and the virtual beacon gradually decreases to obtain a judgement result,
- a step size adjusting module, which is configured for adjusting the step size of a PDR positioning algorithm according to the judgement result; when the distance gradually decreases, decreasing the step size of the PDR positioning algorithm, and when the distance gradually increases, increasing the step size of the PDR positioning algorithm, and
- a positioning module, which is configured for when the range judging module judges that the positioning terminal enters the coverage range of the virtual beacon, positioning the positioning terminal by a PDR positioning algorithm with the step size adjusted to obtain a positioning result; and/or, when the range judging module judges that the positioning terminal does not enter the coverage range of the virtual beacon, positioning the positioning terminal by a PDR positioning algorithm with the step size not adjusted to obtain a positioning result.

In a third aspect, a computer device is provided, including a memory and a processor. The memory is configured for storing a computer program. The steps of the method described above are implemented when the processor executes the computer program.

In a fourth aspect, a computer-readable storage medium is provided, having a computer program stored therein. The steps of the method described above are implemented when the computer program is executed by a processor.

Compared to the prior art, according to the relationship between the positioning terminal and the virtual beacon, the step size in the PDR positioning algorithm is adaptively adjusted according to the present invention, so that the problem that the positioning result deviates from the actual travel trajectory due to the hysteresis caused by performing positioning in the back end can be avoided, and the positioning accuracy is thus improved. Moreover, the positioning result is constrained by a constraint road network, which further improves the positioning accuracy.

DETAILED DESCRIPTION

Figure 1:
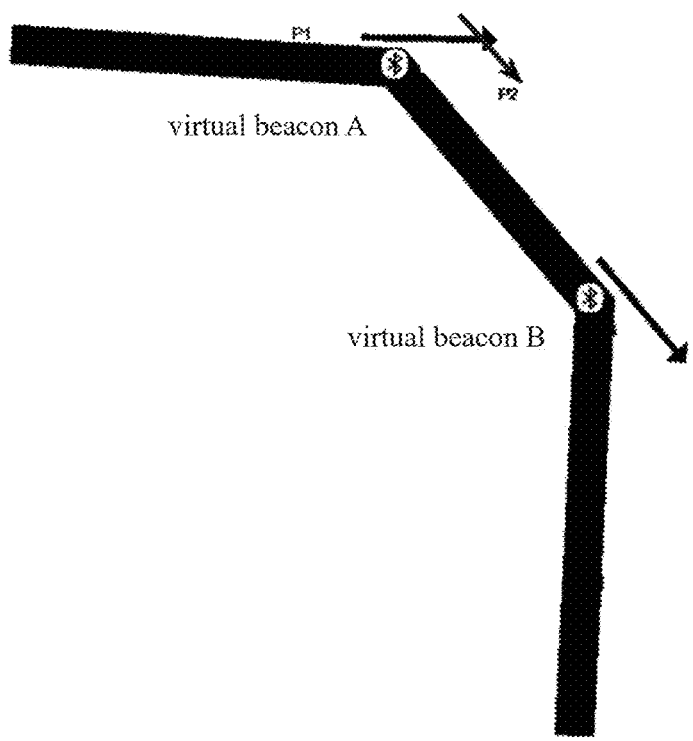
FIG. 1 is a schematic diagram in which positioning deviates from an actual travel trajectory during positioning updating according to the prior art.

The accompanying drawings are for exemplary illustration only, and should not be construed as limitations on this patent. In order to better illustrate the following embodiments, some parts of the accompanying drawings may be omitted, enlarged or reduced, and do not represent the size of actual products, for those skilled in the art, it is understandable that certain well-known structures and descriptions thereof may be omitted in the drawings.

Embodiment 1

Figure 2:
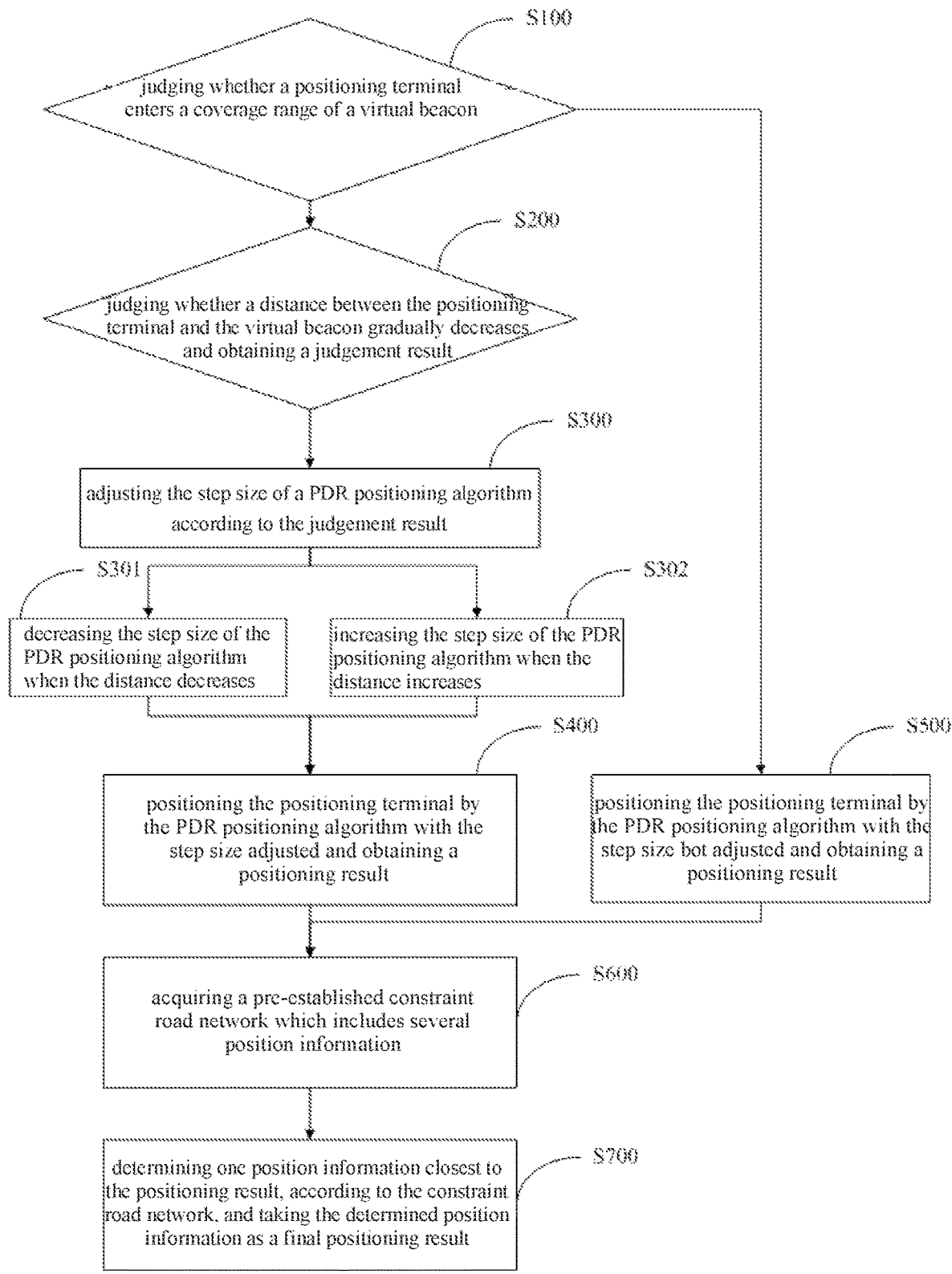
FIG. 2 is a schematic flow chart of an indoor positioning method according to Embodiment 1.

As shown in FIG. 2, the present embodiment provides an indoor positioning method. The present embodiment is illustrated with the method applied to a positioning terminal. However, it is understandable that the method can also be applied to a server, and further to a system including a positioning terminal and a server, which is implemented by interaction of the terminal and the server. According to the present embodiment, the method includes the following steps.

In step S100, whether a positioning terminal enters a coverage range of a virtual beacon is judged, if yes, a step S200 is executed, and if not, a step S500 is executed.

During walking, by triggering the positioning terminal to generate a positioning request, a user of the positioning terminal can acquire the position where the positioning terminal triggers the positioning request. When the user needs to obtain positioning information of the positioning terminal, the positioning request for the position w % here the positioning terminal is currently located can be triggered by a positioning program pre-set for the positioning terminal. The positioning terminal responds to the positioning request and acquires initial position information about the positioning terminal according to the positioning request. The initial position information, which is position information about the position where the positioning terminal is currently located, is acquired by the positioning terminal using a wireless positioning technology, such as a WiFi positioning technology and a Bluetooth positioning technology. The initial position information can be represented in the form of three-dimensional coordinates. Preferably, taking the Bluetooth positioning technology as an example, in a scene for positioning. Bluetooth beacons for positioning are deployed in advance so as to establish an indoor positioning network based on the Bluetooth beacons. A unique identifier of each Bluetooth beacon and the position information where the Bluetooth beacon is located are recorded and are stored in a database. When the positioning terminal responds to the positioning request, a wireless signal is sent to each Bluetooth beacon, then a distance between the positioning terminal and each Bluetooth beacon is obtained according to the sequence of time when each Bluetooth beacon receives the wireless signal sent by the positioning terminal. Then according to the obtained distance to each Bluetooth beacon, the position information about the corresponding Bluetooth beacon is extracted from the database. Finally, according to the distance to the Bluetooth beacon and the position information about the Bluetooth beacon, positioning processing is performed on the current position of the positioning terminal through a pre-set positioning algorithm to determine the initial position information about the positioning terminal.

Specifically, the coverage range of the virtual beacon is a circle with a preset coverage radius of R. The step S100 may specifically includes judging whether a distance between the positioning terminal and the virtual beacon is less than the preset coverage radius, if yes, it is determined as entering the coverage range of the virtual beacon, and if not, it is determined as not entering the coverage range of the virtual beacon.

According to the present invention, before performing positioning, a plurality of virtual beacons in the established indoor positioning network are arranged in advance, and unique identifiers of the virtual beacons and position information thereof are recorded and stored into the database, in which coverage ranges of the plurality of virtual beacons do not overlap. Assuming that the distance between the positioning terminal and the virtual beacon is $distance_t$, whether $distance_t$ is less than the preset coverage radius R is judged. If $distance_t<R$, it is judged that the positioning terminal has entered the coverage range of the virtual beacon, and if, $distance_t>R$, it is determined that the positioning terminal does not enter the coverage range of the virtual beacon. The distance $distance_t$ between the positioning terminal and the virtual beacon can be determined according to the acquired initial position information of the positioning terminal and the position information of the virtual beacon. Preferably, the distance between the positioning terminal and each virtual beacon is obtained according to the acquired position information of the plurality of virtual beacons and the acquired initial position information of the positioning terminal, the virtual beacon with the minimum distance to the positioning terminal is taken as the nearest virtual beacon, then the distance between the positioning terminal and the nearest virtual beacon is compared with the preset coverage radius of the virtual beacon, so as to judge whether the positioning terminal enters the coverage range of the virtual beacon.

In step S200, whether the distance between the positioning terminal and the virtual beacon gradually decreases is judged, and a judgement result is obtained.

The step 200 specifically includes: at least acquiring the distance between the positioning terminal and the virtual beacon twice, and judging whether the distance between the positioning terminal and the virtual beacon acquired previously is greater than the distance between the positioning terminal and the virtual beacon acquired subsequently, if yes, a judgement result is obtained indicating that the distance between the positioning terminal and the virtual beacon gradually decreases; and if not, a judgement result is obtained indicating that the distance between the positioning terminal and the virtual beacon does not gradually decrease.

A user may continuously change the position of a terminal by walking during the process of actually positioning via the terminal, the user thus needs to continuously initiate the positioning request aiming at the positioning terminal via the terminal during the working process of the user, so that the terminal can continuously update the positioning result of the positioning terminal. Therefore, the positioning request before and adjacent to the positioning request of the positioning terminal is a previous positioning request, and the distance between the positioning terminal and the virtual beacon acquired according to the previous positioning request is the distance between the positioning terminal and the virtual beacon acquired previously. It is assumed that the distance between the positioning terminal and the virtual beacon acquired previously is $distance_{i-1}$, and the distance between the positioning terminal and the virtual beacon acquired subsequently is $distance_i$. The distance $distance_i$ between the positioning terminal and the virtual beacon acquired subsequently is compared with the distance $distance_{i-1}$ between the positioning terminal and the virtual beacon acquired previously, if $distance_i<distance_{i-1}$, the obtained judgement result indicates that the distance between the positioning terminal and the virtual beacon gradually decreases, otherwise, the obtained judgement result indicates that the distance between the positioning terminal and the virtual beacon does not gradually decrease. The judgement result indicating that the distance between the positioning terminal and the virtual beacon does not gradually decrease includes a judgement result indicating that the distance between the positioning terminal and the virtual beacon is unchanged, and a judgement result indicating that the distance between the positioning terminal and the virtual beacon gradually increases, namely if $distance_i>distance_{i-1}$, the obtained judgement result indicates that the distance between the positioning terminal and the virtual beacon gradually increases, and if $distance_i=distance_{i-1}$, the obtained determining result indicates that the distance between the positioning terminal and the virtual beacon is unchanged.

In step S300, the step size of a PDR positioning algorithm is adjusted according to the judgement result.

Specifically, according to the present embodiment, when the positioning terminal responds to the positioning request, acceleration information of the positioning terminal is acquired. The acceleration information can be acquired through an accelerometer of the positioning terminal. Preferably, the number of the acceleration information can be multiple. A step size calculation method in the PDR positioning algorithm includes determining a sequence of the sum of squares of the plurality of the acceleration information according to the acquired plurality of acceleration information, and calculating a variance of the sequence of the sum of squares, then comparing the variance with a pre-set empirical threshold value, and determining the step size in the PDR positioning algorithm according to a comparison result and a pre-set empirical coefficient. It is assumed that the acquired sequence of the several pieces of acceleration information is ccdatas=$\{(x_0, y_0, z_0), (x_1, y_1, z_1), \ldots, (x_i, y_i, z_i)\}$, wherein $x_i$ is acceleration data of the $i_{th}$ acceleration information on an x axis, $y_i$ is acceleration data of the $i_{th}$ acceleration information on a y axis, and $z_i$ is acceleration data of the $i_{th}$ acceleration information on a z axis, the sequence of the sum of squares of the plurality of pieces of acceleration information obtained according to the sequence is p=$(p_0, p_1, \ldots, p_i)$, wherein $p_i=x_i^2+y_i^2+z_i^2$, $p_i$ is the sum of squares of the $i_{th}$ acceleration information, then a variance thereof var=D(p) according to the sequence of the sum of squares is calculated, and the step size in the PDR localization algorithm is calculated according to the following formula:

$$stepLength = \begin{cases} \text{var} * coef, & \text{var} \geq \text{var}_0 \\ 0, & \text{var} < \text{var}_0 \end{cases}$$

wherein, stepLength is the step size in the PDR positioning algorithm, $\text{var}_0$ is the pre-set empirical threshold value, coef is the pre-set empirical coefficient. Finally, according to the judgement result, the step size stepLength in the PDR positioning algorithm is adjusted.

According to the present embodiment, the pre-set empirical coefficient can be a numerical value matching the step size of the PDR positioning algorithm, and can also be a numerical value continuously changing according to the change of the position where the positioning terminal is located in the walking process. Specifically, the pre-set empirical coefficient can be a step frequency adapted to the step size in the PDR positioning algorithm. Since different users walk differently, the speed of the corresponding position change of the positioning terminal is also different, and thus the pre-set empirical coefficient can also change accordingly.

In step S301, when the distance gradually decreases, the step size of the PDR positioning algorithm is decreased.

The step S301 can specifically include determining the step size decreasing strategy of the PDR positioning algorithm according to the distance between the positioning terminal and the virtual beacon, and decreasing the step size of the PDR positioning algorithm according to the determined step size decreasing strategy, when the distance between the positioning terminal and the virtual beacon gradually decreases.

According to the embodiment, in order to determine the step size decreasing strategy of the PDR positioning algorithm according to the distance between the positioning terminal and the virtual beacon, and decrease the step size of the PDR positioning algorithm according to the determined step size decreasing strategy, a reduction coefficient is determined according to the distance between the positioning terminal and the virtual beacon, and the reduction coefficient is multiplied by the step size of the PDR positioning algorithm so as to decrease the step size of the PDR positioning algorithm.

Specifically, the reduction coefficient determined according to the distance between the positioning terminal and the virtual beacon is $a_1$, wherein $a_1 = (1.0 - 1.0/(1 + \text{distance}_i)$, the calculation formula for decreasing the step size of the PDR positioning algorithm is as follows:

$$stepLength_0 = stepLength * \left(1.0 - \frac{1.0}{1 + \text{distance}_i}\right);$$

Therefore, when the distance between the positioning terminal and the virtual beacon is smaller, the step size in the PDR positioning algorithm will be smaller, and when the distance between the positioning terminal and the virtual beacon is larger, the step size in the PDR positioning algorithm will be larger, so that the step size in the PDR positioning algorithm can be adaptively adjusted according to the distance between the positioning terminal and the virtual beacon, and the problem that the positioning result deviates from the actual travel trajectory due to hysteresis caused by positioning in the back end can be avoided, the positioning accuracy thus is improved.

In step S302, when the distance gradually increases, the step size of the PDR positioning algorithm is increased.

The step S302 can specifically include determining the step size increasing strategy of the PDR positioning algorithm according to the distance between the positioning terminal and the virtual beacon, and increasing the step size of the PDR positioning algorithm according to the determined step size increasing strategy, when the distance between the positioning terminal and the virtual beacon gradually increases.

According to the present embodiment, in order to determine the step size increasing strategy of the PDR positioning algorithm according to the distance between the positioning terminal and the virtual beacon, and increase the step size of the PDR positioning algorithm according to the determined step size increasing strategy, a multiplication coefficient is determined according to the distance between the positioning terminal and the virtual beacon, and the multiplication coefficient is multiplied by the step size of the PDR positioning algorithm so as to increase the step size of the PDR positioning algorithm.

Specifically, the multiplication coefficient determined according to the distance between the positioning terminal and the virtual beacon is $a_2$, wherein $a_2 = (1.0 + 1.0/1 + \text{distance}_i)$, the calculation formula for increasing the step size of the PDR positioning algorithm is as follows:

$$stepLength_0 = stepLength * \left(1.0 + \frac{1.0}{1 + \text{distance}_i}\right).$$

In step S400, the positioning terminal is positioned by a PDR positioning algorithm with the step size adjusted, and a positioning result is obtained.

Specifically, azimuth angle information about the positioning terminal is acquired. The azimuth angle information can read real-time compass data via an electronic compass carried by the terminal, and azimuth angle information corresponding to the positioning terminal in real time is calculated based on the obtained compass data, which is the azimuth angle information about the positioning terminal. According to the acquired initial position information, acceleration information and azimuth angle information about the positioning terminal, the positioning terminal is positioned by the PDR positioning algorithm with the step size adjusted o as to obtain the positioning result.

In step S500, the positioning terminal is positioned by a PDR positioning algorithm with the step size not adjusted, and a positioning result is obtained.

Specifically, initial position information, acceleration information and azimuth angle information are acquired about the position where the positioning terminal is currently located. The positioning terminal is positioned by the PDR positioning algorithm with the step size not adjusted according to the initial position information, acceleration information and azimuth angle information so as to obtain the positioning result.

According to one embodiment, the method further includes the following steps.

In step S600, a pre-established constraint road network is acquired, which includes several pieces of position information.

In step S700, according to the constraint road network, one position information closest to the positioning result is determined, and the determined position information is taken as a final positioning result of the positioning terminal.

Specifically, it is assumed that sequence coordinates of the Bluetooth beacons deployed in the path where the user walks, that is, the sequence coordinates of the Bluetooth beacons in an indoor positioning network, are points={$(lon_0, lat_0), (lon_1, lat_1), \ldots, (lon_i, lat_i)$}, wherein $(lon_i, lat_i)$ represents the coordinate of the $i_{th}$ Bluetooth beacon, namely, position information about $i_{th}$ the Bluetooth beacon; using the deployed indoor positioning network in advance. A topology operation mode of an open source GIS operation package JTS is used to construct the constraint road network lineString in the form of:

$$lineString = LINESTRING(lon_0\ lat_0, lon_1\ lat_1, \ldots, lon_i\ lat_i)$$

It is assumed that the obtained positioning result is (lon' lat'), a position information (lon, lat) closest to the positioning result is determined on the pre-constructed constraint road network lineString. The position information (lon, lat) is used as the final positioning result.

In another embodiment, in the step S301, in order to decrease the step size of the PDR positioning algorithm when the distance gradually decreases, the step size of the PDR positioning algorithm is decreases according to a pre-set monotonic decreasing function, when the distance between the positioning terminal and the virtual beacon gradually decreases.

Specifically, the pre-set monotonic decreasing function is associated with the distance $distance_i$ between the positioning terminal and the virtual beacon, and the pre-set monotonic decreasing function decreases as the distance $distance_i$ between the positioning terminal and the virtual beacon decreases.

In step S302, in order to increase the step size of the PDR positioning algorithm when the distance gradually increases, the step size of the PDR positioning algorithm is increased according to a pre-set monotonic increasing function, when the distance between the positioning terminal and the virtual beacon gradually increases.

Specifically, the pre-set monotonic increasing function is associated with the distance $distance_i$ between the positioning terminal and the virtual beacon, and the pre-set monotonic decreasing function increases as the distance $distance_i$ between the positioning terminal and the virtual beacon increases.

Embodiment 2

Figure 3:
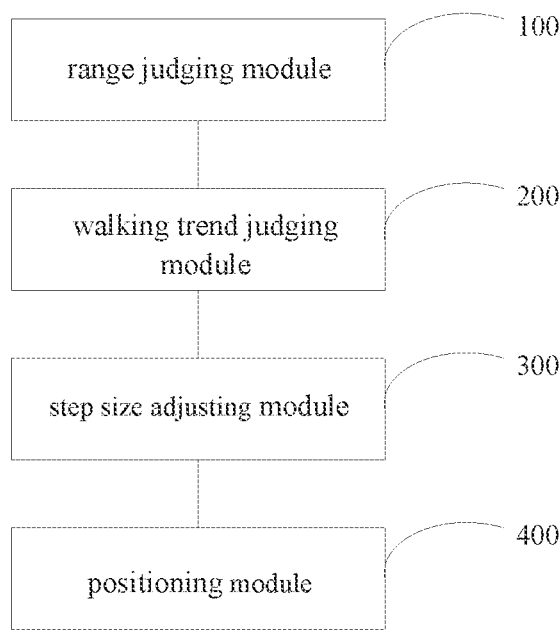
FIG. 3 is a schematic block diagram of an indoor positioning system according to Embodiment 2.

As shown in FIG. 3, based on the same inventive concept as that of Embodiment 1, the present embodiment provides an indoor positioning system, including a range determining module 100, a walking trend determining module 200, a step size adjusting module 300, and a positioning module 400.

The range judging module 100 is configured for judging whether a positioning terminal enters a coverage range of a virtual beacon.

The walking trend judging module 200 is configured for determining whether a distance between the positioning terminal and the virtual beacon gradually decreases to obtain a judgement result.

The step size adjusting module 300 is configured for, adjusting the step size of a PDR positioning algorithm according to the judgment result. When the distance gradually decreases, the step size of the PDR positioning algorithm is decreased, and when the distance gradually increases, the step size of the PDR positioning algorithm is increased.

The positioning module 400 is configured for positioning the positioning terminal by a PDR positioning algorithm with the step size adjusted, when the range judging module 100 judges that the positioning terminal enters the coverage range of the virtual beacon, and thus obtaining a positioning result. The positioning module 400 is also configured for positioning the positioning terminal by a PDR positioning algorithm with the step size not adjusted, when the range judging module 100 judges that the positioning terminal does not enter the coverage range of the virtual beacon, and obtaining a positioning result.

Figure 4:
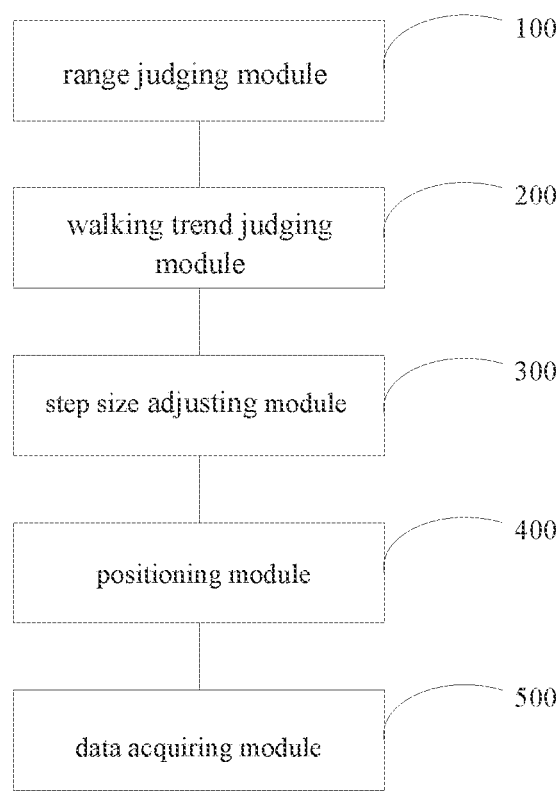
FIG. 4 is another schematic block diagram of the indoor positioning system according to Embodiment 2.

According to one embodiment, as shown in FIG. 4, the system further includes a data acquiring module 500 configured for acquiring a pre-established constraint road network which includes several position information.

The positioning module 400 is further used for determining a piece of position information closest to the positioning result according to the constraint road network, and the determined position information is taken as the final positioning result of the positioning terminal.

In one embodiment, the method for judging whether the positioning terminal enters the coverage range of the virtual beacon by the range judging module 100 specifically includes: judging whether the distance between the positioning terminal and the virtual beacon is less than a pre-set coverage radius, if yes, the positioning terminal is determined as entering the coverage range of the virtual beacon; and if not, positioning terminal is determined as not entering the coverage range of the virtual beacon.

In one embodiment, the data acquiring module 500 is further used for acquiring the distance between the positioning terminal and the virtual beacon at least twice.

The method for determining whether the distance between the positioning terminal and the virtual beacon gradually decreases by the walking trend judging module 200 to obtain the judgement result specifically includes: judging whether the distance between the positioning terminal and the virtual beacon acquired previously is greater than the distance between the positioning terminal and the virtual beacon acquired subsequently, if yes, a judgement result is obtained indicating that the distance between the positioning terminal and the virtual beacon gradually decreases; and if not, a judgement result is obtained indicating that the distance between the positioning terminal and the virtual beacon does not gradually decrease.

In one embodiment, the step size adjusting module 300 is further used for when the distance gradually decreases, determining a step size decreasing strategy of the PDR positioning algorithm according to the distance, and decreasing the step size of the PDR positioning algorithm according to the determined step size decreasing strategy, and/or, when the distance gradually increases, determining a step size increasing strategy of the PDR positioning algorithm according to the distance, and increasing the step size of the PDR positioning algorithm according to the determined step size increasing strategy.

In one embodiment, in order to decrease the step size of the PDR positioning algorithm according to the determined step size decreasing strategy determined by the step size adjusting module 300, a reduction coefficient is determined according to the distance, and the reduction coefficient is multiplied by the step size of the PDR positioning algorithm.

Similarly, in order to increase the step size of the PDR positioning algorithm according to the determined step size increasing strategy determined by the step size adjusting module 300, a multiplication coefficient is determined according to the distance, and the multiplication coefficient is multiplied by the step size of the PDR positioning algorithm.

In one embodiment, the step size adjusting module 300 is further used for decreasing the step size of the PDR positioning algorithm according to a pre-set monotonic decreasing function when the distance gradually decreases, and/or increasing the step size of the PDR positioning algorithm according to a pre-set monotonic increasing function when the distance gradually increases.

Embodiment 3

In this embodiment, a computer device is provided. The computer device may be a terminal, and the computer device includes a processor, a memory, a communication interface, a display screen and an input device connected via a system bus. The processor of the computer device is used for providing computing and control capabilities. The memory comprises an operating system in a non-volatile storage medium and an environment for running a computer program. The communication interface is used for communication with an external terminal in a wired or wireless manner. The wireless manner can be realized through WiFi, NFC (near field communication) or other technologies. When the computer program is executed by the processor, the indoor positioning method as described in Embodiment 1 is implemented.

Embodiment 4

In this embodiment, a computer-readable storage medium is provided, in which a computer program is stored. When the computer program is executed by a processor, the indoor positioning method as described in Embodiment 1 is implemented.

Obviously, the above-mentioned embodiments of the present invention are only examples for clearly illustrating the technical solution of the present invention, rather than limiting the specific mode of implementation of the present invention. Any modification, equivalent replacement, improvement, etc. made within the spirit and principle of the claims of the present invention shall be included within the protection scope of the claims of the present invention.

The invention claimed is:

1. An indoor positioning method, comprising:
judging whether a positioning terminal enters a coverage range of a virtual beacon,
   if yes, judging whether a distance between the positioning terminal and the virtual beacon decreases to obtain a judgement result;
      adjusting a step size of a Pedestrian Dead Reckoning (PDR) positioning algorithm, according to the judgement result, when the distance decreases, decreasing the step size of the PDR positioning algorithm, and when the distance increases, increasing the step size of the PDR positioning algorithm; and
      positioning the positioning terminal by the PDR positioning algorithm with the step size adjusted to obtain a positioning result, and
   if not, positioning the positioning terminal using the PDR positioning algorithm with the step size not adjusted to obtain a positioning result,
acquiring a pre-established constraint road network which includes at least two position information, and
determining one position information closest to the positioning result according to the constraint road network, and taking the determined position information as a final positioning result of the positioning terminal.

2. The indoor positioning method according to claim 1, wherein the method for judging whether the positioning terminal enters the coverage range of the virtual beacon comprises:
judging whether the distance between the positioning terminal and the virtual beacon is less than a pre-set coverage radius,
   if yes, determining as entering the coverage range of the virtual beacon; and
   if not, determining as not entering the coverage range of the virtual beacon.

3. The indoor positioning method according to claim 1, wherein the method for judging whether the distance between the positioning terminal and the virtual beacon decreases to obtain the judgement result comprises:
at least acquiring the distance between the positioning terminal and the virtual beacon twice, and
judging whether the distance between the positioning terminal and the virtual beacon acquired previously is greater than the distance between the positioning terminal and the virtual beacon acquired subsequently,
   if yes, obtaining the judgement result indicating that the distance between the positioning terminal and the virtual beacon decreases; and
   if not, obtaining the judgement result indicating that the distance between the positioning terminal and the virtual beacon does not decrease.

4. The indoor positioning method according to claim 3, wherein when the distance decreases, the method for decreasing the step size of the PDR positioning algorithm comprises:
when the distance decreases, determining a step size decreasing strategy of the PDR positioning algorithm according to the distance, and decreasing the step size of the PDR positioning algorithm according to the determined step size decreasing strategy.

5. The indoor positioning method according to claim 3, wherein when the distance increases, the method for increasing the step size of the PDR positioning algorithm comprises:
when the distance increases, determining a step size increasing strategy of the PDR positioning algorithm according to the distance, and increasing the step size of the PDR positioning algorithm according to the determined step size increasing strategy.

6. The indoor positioning method according to claim 4, wherein the method for determining the step size decreasing strategy of the PDR positioning algorithm according to the distance, and decreasing the step size of the PDR positioning algorithm according to the determined step size decreasing strategy comprises:
determining a reduction coefficient according to the distance, and multiplying the reduction coefficient by the step size of the PDR positioning algorithm so as to decrease the step size of the PDR positioning algorithm.

7. The indoor positioning method according to claim 5, wherein the method for determining the step size increasing strategy of the PDR positioning algorithm according to the distance, and increasing the step size of the PDR positioning algorithm according to the determined step size increasing strategy comprises:
determining a multiplication coefficient according to the distance, and multiplying the multiplication coefficient by the step size of the PDR positioning algorithm so as to increase the step size of the PDR positioning algorithm.

8. The indoor positioning method according to claim 3, wherein when the distance decreases, the method for decreasing the step size of the PDR positioning algorithm comprises:
when the distance decreases, decreasing the step size of the PDR positioning algorithm according to a pre-set monotonic decreasing function.

9. The indoor positioning method according to claim 3, wherein when the distance increases, the method for increasing the step size of the PDR positioning algorithm comprises:
when the distance increases, increasing the step size of the PDR positioning algorithm according to a pre-set monotonic increasing function.

10. A computer device, comprising a memory storing a computer program and a processor, wherein the steps of the method according to claim 1 are implemented when the processor executes the computer program.

11. A non-transitory computer-readable storage medium, having a computer program stored therein, wherein the steps of the method according to claim 1 are implemented when the computer program is executed by a processor.

12. An indoor positioning system, comprises:
a range judging module, which is configured for judging whether a positioning terminal enters a coverage range of a virtual beacon,
a walking trend judging module, which is configured for judging whether a distance between the positioning terminal and the virtual beacon decreases to obtain a judgement result,
a step size adjusting module, which is configured for according to the judgement result, adjusting the step size of a Pedestrian Dead Reckoning (PDR) positioning algorithm, when the distance decreases, the step size of the PDR positioning algorithm is decreased, and when the distance increases, the step size of the PDR positioning algorithm increased, and
a positioning module, which is configured for when the range judging module judges that the positioning terminal enters the coverage range of the virtual beacon, positioning the positioning terminal using the PDR positioning algorithm with the step size adjusted to obtain a positioning result; and/or, when the range judging module judges that the positioning terminal does not enter the coverage range of the virtual beacon, positioning the positioning terminal using the PDR positioning algorithm with the step size not adjusted to obtain a positioning result,
wherein the indoor positioning system further comprises a data acquiring module, which is configured for acquiring a pre-established constraint road network which includes at least two position information, and
wherein the positioning module is further configured for determining one position information closest to the positioning result according to the constraint road network, and taking the determined position information as a final positioning result of the positioning terminal.

* * * * *